US012610038B2

(12) United States Patent
Choi et al.

(10) Patent No.: US 12,610,038 B2
(45) Date of Patent: Apr. 21, 2026

(54) METHOD AND APPARATUS FOR VIDEO CODING USING INTRA PREDICTION BASED ON REFERENCE SAMPLE LINE DERIVATION

(71) Applicants: Hyundai Motor Company, Seoul (KR); Kia Corporation, Seoul (KR); Kwangwoon University Industry-Academic Collaboration Foundation, Seoul (KR)

(72) Inventors: Han Sol Choi, Dongducheon (KR); Min Hun Lee, Uijeongbu (KR); Dong Gyu Sim, Seoul (KR); Jin Heo, Yongin (KR); Seung Wook Park, Yongin (KR)

(73) Assignees: Hyundai Motor Company, Seoul (KR); Kia Corporation, Seoul (KR); Kwangwoon University Industry-Academic Collaboration Foundation, Seoul (KR)

( * ) Notice: Subject to any disclaimer, the term of this patent is extended or adjusted under 35 U.S.C. 154(b) by 7 days.

(21) Appl. No.: 18/734,540

(22) Filed: Jun. 5, 2024

(65) Prior Publication Data

US 2024/0323356 A1 Sep. 26, 2024

Related U.S. Application Data

(63) Continuation of application No. PCT/KR2022/ 015401, filed on Oct. 12, 2022.

(30) Foreign Application Priority Data

Dec. 6, 2021 (KR) ........................ 10-2021-0172938
Oct. 11, 2022 (KR) ........................ 10-2022-0129732

(51) Int. Cl.
*H04N 19/105* (2014.01)
*H04N 19/159* (2014.01)
*H04N 19/176* (2014.01)

(52) U.S. Cl.
CPC ......... *H04N 19/105* (2014.11); *H04N 19/159* (2014.11); *H04N 19/176* (2014.11)

(58) Field of Classification Search
CPC .......................... H04N 19/105; H04N 19/159
See application file for complete search history.

(56) References Cited

U.S. PATENT DOCUMENTS

| 11,019,360 | B2 * | 5/2021 | Ramasubramonian ..................... H04N 19/593 |
| 11,363,284 | B2 * | 6/2022 | Ramasubramonian ..................... H04N 19/117 |
| 11,606,554 | B2 * | 3/2023 | Bross .................... H04N 19/176 |
| 11,930,212 | B2 * | 3/2024 | Lee ....................... H04N 19/132 |

(Continued)

FOREIGN PATENT DOCUMENTS

| KR | 10-2020-0128138 A | 11/2020 |
| KR | 10-2021-0134267 A | 11/2021 |

(Continued)

*Primary Examiner* — Irfan Habib
(74) *Attorney, Agent, or Firm* — Fox Rothschild LLP

(57) ABSTRACT

A method and apparatus for video coding utilize intra prediction based on reference sample line derivation. The video coding method and the apparatus derive reference sample lines of the current block by using various derivation schemes. The video coding method and the apparatus perform intra prediction of the current block by using the derived reference sample lines.

13 Claims, 15 Drawing Sheets

Fourth Derivation Method

☐ Processing Unit   ☐ Coding Unit   ▦ Current Block   ▨ Reconstructed Region

(56)                           References Cited

U.S. PATENT DOCUMENTS

| | | | |
|---|---|---|---|
| 12,058,322 B2 * | 8/2024 | Sarwer | H04N 19/159 |
| 12,069,312 B2 * | 8/2024 | Samuelsson | H04N 19/172 |
| 12,108,035 B2 * | 10/2024 | Lee | H04N 19/117 |
| 2017/0374369 A1 * | 12/2017 | Chuang | H04N 19/70 |
| 2018/0324418 A1 * | 11/2018 | Koo | H04N 19/147 |
| 2018/0332284 A1 * | 11/2018 | Liu | H04N 19/70 |
| 2019/0116381 A1 * | 4/2019 | Lee | H04N 19/593 |
| 2020/0137381 A1 * | 4/2020 | Van der Auwera | H04N 19/176 |
| 2020/0204799 A1 * | 6/2020 | Lee | H04N 19/593 |
| 2020/0244956 A1 * | 7/2020 | Lee | H04N 19/52 |
| 2020/0275096 A1 * | 8/2020 | Rath | H04N 19/159 |
| 2020/0366931 A1 * | 11/2020 | Ko | H04N 19/11 |
| 2021/0006799 A1 * | 1/2021 | Lee | H04N 19/46 |
| 2021/0144365 A1 * | 5/2021 | Filippov | H04N 19/176 |
| 2021/0176492 A1 * | 6/2021 | Kim | H04N 19/80 |
| 2021/0211653 A1 * | 7/2021 | Lim | H04N 19/159 |
| 2021/0211709 A1 * | 7/2021 | Zhang | H04N 19/132 |
| 2021/0243429 A1 * | 8/2021 | Lee | H04N 19/11 |
| 2021/0281854 A1 * | 9/2021 | Moon | H04N 19/593 |
| 2021/0289229 A1 * | 9/2021 | Ahn | H04N 19/157 |
| 2022/0272331 A1 * | 8/2022 | Zhao | H04N 19/184 |
| 2022/0385922 A1 * | 12/2022 | Galpin | H04N 19/593 |
| 2023/0021055 A1 * | 1/2023 | Jeong | H04N 19/182 |
| 2024/0196009 A1 * | 6/2024 | Byeon | H04N 19/136 |
| 2024/0364860 A1 * | 10/2024 | Wang | H04N 19/11 |
| 2024/0364864 A1 * | 10/2024 | Wang | H04N 19/50 |

FOREIGN PATENT DOCUMENTS

| | | | |
|---|---|---|---|
| WO | 2018/070790 A1 | 4/2018 | |
| WO | 2020/058896 A1 | 3/2020 | |
| WO | 2021/058383 A1 | 4/2021 | |

* cited by examiner

☐ Coding Tree Unit    ☐ Coding Unit    ▩ Current Block    ▨ Reconstructed Region (xT, yT)

Inter        Inter

Inter

Inter        Inter (xL, yL)

Intra        puH

Inter        puW vpduH vpduW

First Derivation Method

☐ Processing Unit     ☐ Coding Unit     ▨ Current Block     ▨ Reconstructed Region Second Derivation Method ☐ Processing Unit  ☐ Coding Unit  ▦ Current Block  ▨ Reconstructed Region Third Derivation Method ☐ Processing Unit    ☐ Coding Unit    ▦ Current Block    ⧄ Reconstructed Region Fourth Derivation Method Processing Unit  Coding Unit  Current Block  Reconstructed Region

METHOD AND APPARATUS FOR VIDEO CODING USING INTRA PREDICTION BASED ON REFERENCE SAMPLE LINE DERIVATION

CROSS-REFERENCE TO RELATED APPLICATIONS

This application is a continuation of International Application No. PCT/KR2022/015401 filed on Oct. 12, 2022, which claims under 35 U.S.C. § 119(a) the benefit of Korean Patent Application No. 10-2021-0172938, filed on Dec. 6, 2021, and Korean Patent Application No. 10-2022-0129732, filed on Oct. 11, 2022, the entire disclosures of each of which are incorporated herein by reference.

BACKGROUND

(a) Technical Field

The present disclosure relates to a video coding method and apparatus using intra prediction based on reference sample line derivation.

(b) Description of the Related Art

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

The VVC (versatile video coding) technology when used for predicting the current block (also referred to as 'prediction unit' or PU) according to an intra-prediction mode, generates a prediction block of the current block according to a mode such as MIP (matrix-based intra prediction), DC (direct current), Planar, Angular, and the like. If MIP is the prediction mode, the prediction block is generated without partitioning the current block into sub-blocks according to Intra-Sub Partitions (ISP). Unless MIP is the prediction mode, the prediction block may be generated with or without partitioning the current block into sub-blocks. Regardless of the ISP involvement, the prediction mode may be parsed for the current block. The same prediction mode as the current block may be used for subblocks within the current block to generate a prediction block for each subblock.

To generate these prediction blocks, reference sample lines may be derived. Further, the reference sample lines may be subjected to filtering, and then the filtered reference sample lines may be used to generate prediction blocks according to each prediction mode. Derived as the reference sample lines may be a pixel line adjacent to the left side of the current block and a pixel line adjacent to the top of the current block. When using Multi-Reference Line (MRL)

mode, selected as reference pixel lines may be one top pixel line and one left pixel line among three pixel lines near the left and top of the current block. As the amount of data increases, further advanced methods of using reference sample lines are needed to improve video coding efficiency and enhance video quality.

SUMMARY

The present disclosure provides a video coding method and an apparatus for deriving reference sample lines of the current block by using various derivation schemes to improve video coding efficiency and enhance video quality. The video coding method and the apparatus perform intra prediction of the current block by using the derived reference sample lines.

At least one aspect of the present disclosure provides a method performed by a video decoding device for intra-predicting a current block. The method includes decoding, from a bitstream, an intra-prediction mode of the current block, and a derivation mode index of the current block. Here, the derivation mode index indicate a reference sample line-derivation mode that is one of a fixed-location reference sample-line mode, a variable-location reference sample-line mode, or a reference sample line list-referencing mode. The method also includes determining the reference sample line-derivation mode according to the derivation mode index. The method also includes deriving reference sample lines of the current block according to the reference sample line-derivation mode. Here, the reference sample lines includes a left reference sample line and a top reference sample line. The method also includes generating a prediction block of the current block according to the intra-prediction mode by using reference samples in the reference sample lines.

Another aspect of the present disclosure provides a method performed by a video encoding device for intra-predicting a current block. The method includes determining an intra-prediction mode of the current block and determining a derivation mode index of the current block. Here, the derivation mode index indicating a reference sample line-derivation mode that is one of a fixed-location reference sample-line mode, a variable-location reference sample-line mode, or a reference sample line list-referencing mode. The method also includes determining the reference sample line-derivation mode according to the derivation mode index. The method also includes deriving reference sample lines of the current block according to the reference sample line-derivation mode. Here, the reference sample lines includes a left reference sample line and a top reference sample line. The method also includes generating a prediction block of the current block according to the intra-prediction mode by using reference samples in the reference sample lines.

Yet another aspect of the present disclosure provides a non-transitory computer-readable recording medium storing a bitstream generated by a video encoding method. The video encoding method includes determining an intra-prediction mode of the current block and determining a derivation mode index of the current block. Here, the derivation mode index indicating a reference sample line-derivation mode that is one of a fixed-location reference sample-line mode, a variable-location reference sample-line mode, or a reference sample line list-referencing mode. The video encoding method also includes determining the reference sample line-derivation mode according to the derivation mode index. The video encoding method also includes deriving reference sample lines of the current block according to the reference sample line-derivation mode. Here, the reference sample lines includes a left reference sample line and a top reference sample line. The video encoding method also includes generating a prediction block of the current block according to the intra-prediction mode by using reference samples in the reference sample lines.

As described above, the present disclosure provides a video coding method and an apparatus that derive reference sample lines of the current block by using various derivation schemes. The video coding method and the apparatus perform intra prediction of the current block by using the derived reference sample lines. Thus, the video coding method and the apparatus improve video coding efficiency and enhance video quality.

DETAILED DESCRIPTION

Figure 1:
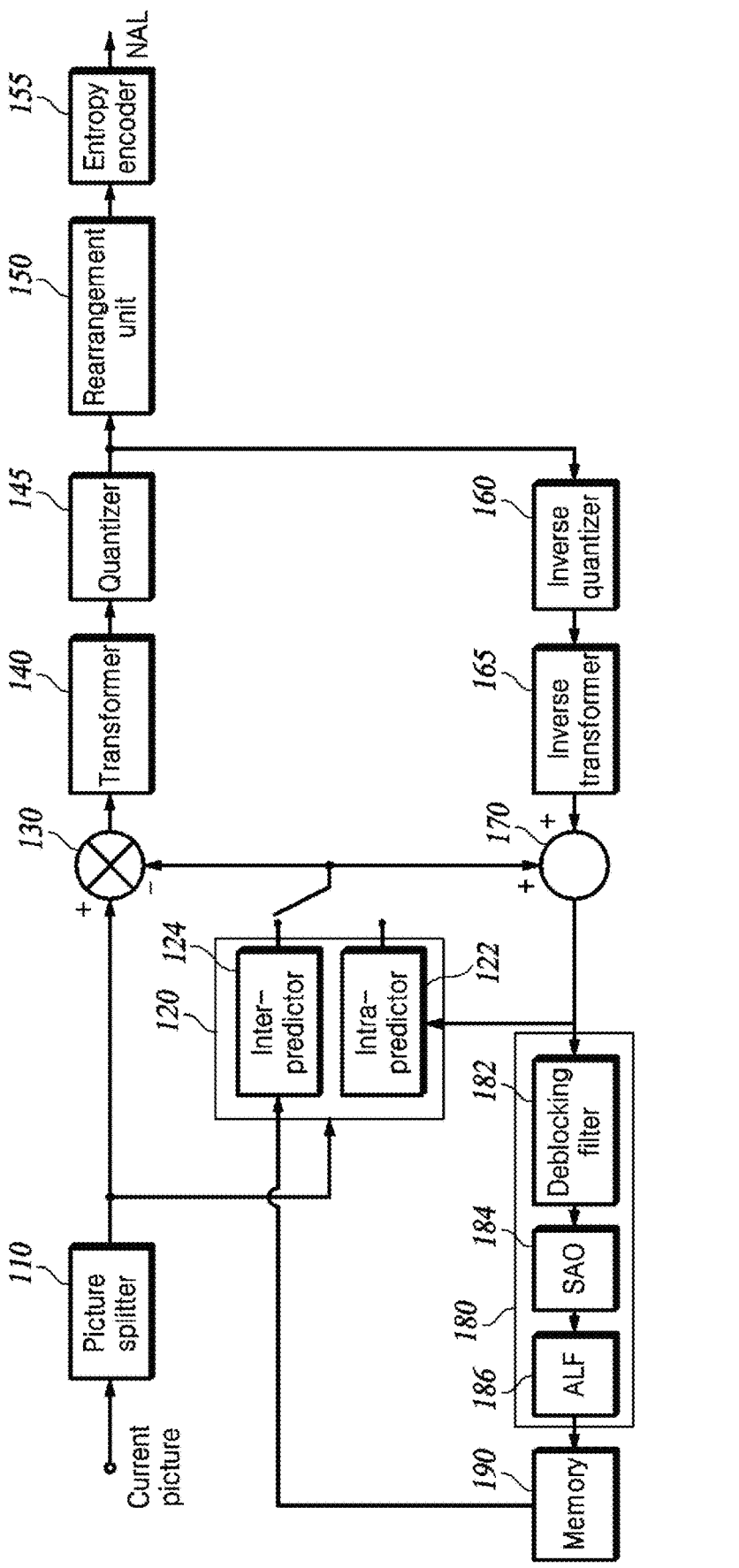
FIG. 1 is a block diagram of a video encoding apparatus that may implement the techniques of the present disclosure.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binary tree (BT) in which the higher node is split into two lower nodes. The tree structure may also be a ternary tree (TT) in which the higher node is split into three lower nodes at a ratio of 1:2:1. The tree structure may also be a structure in which two or more structures among the QT structure, the BT structure, and the TT structure are mixed. For example, a quadtree plus binary tree (QTBT) structure may be used or a quadtree plus binary tree ternary tree (QTBTTT) structure may be used. Here, a binary tree ternary tree (BTTT) is added to the tree structures to be referred to as a multiple-type tree (MTT).

Figure 2:
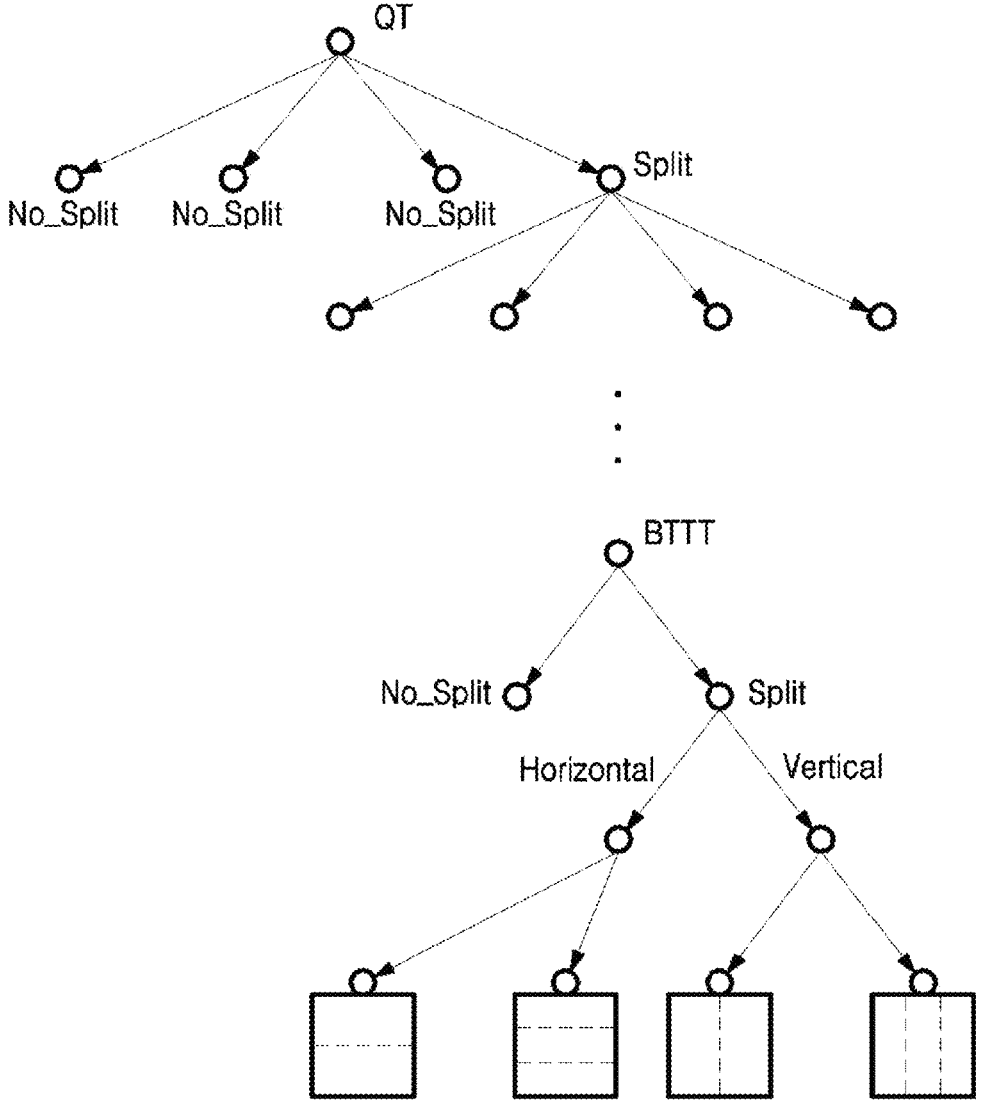
FIG. 2 illustrates a method for partitioning a block using a quadtree plus binary tree ternary tree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag)

indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
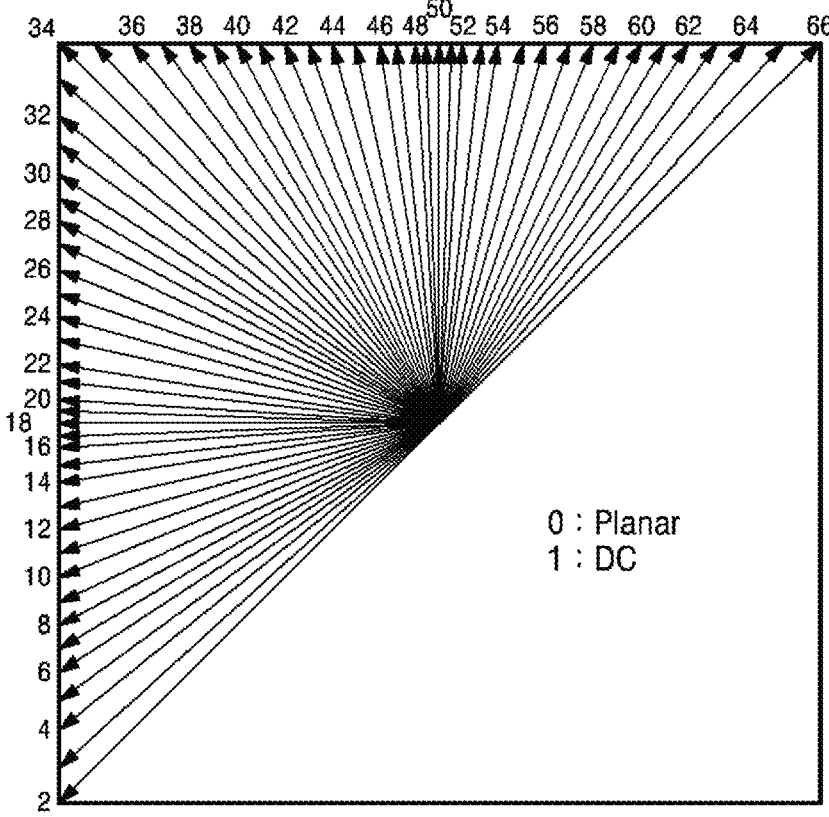
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
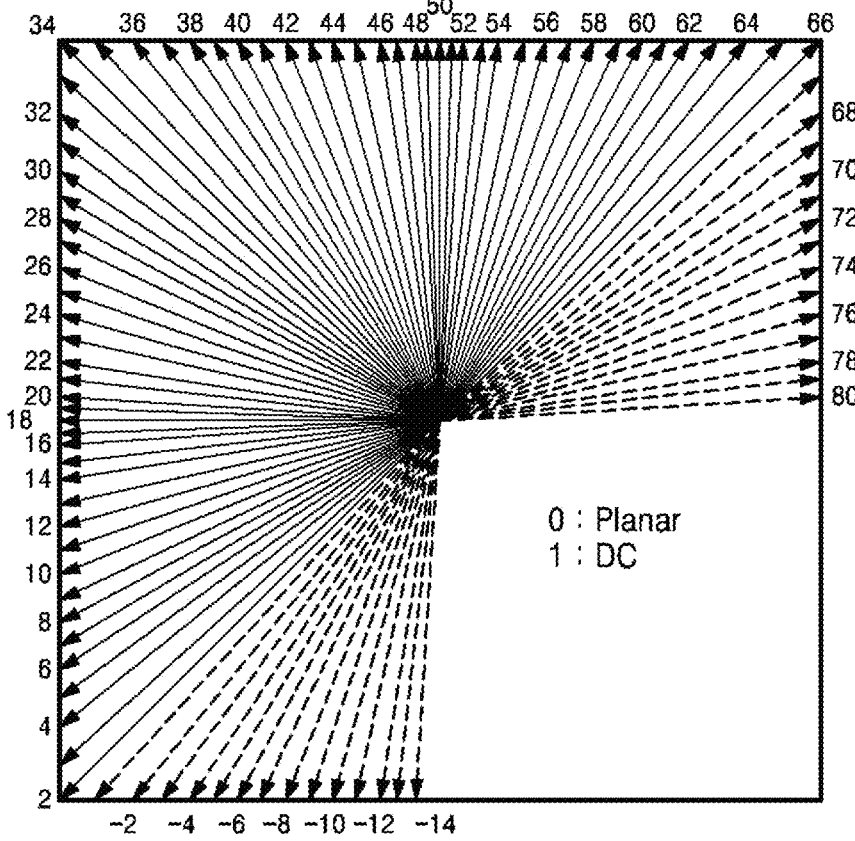

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
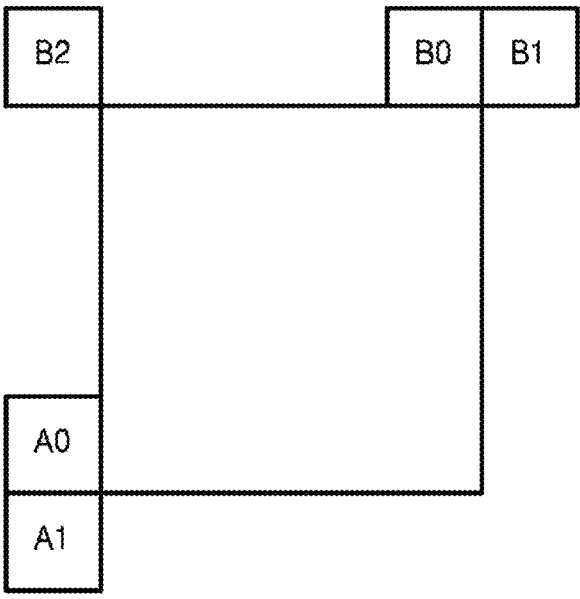
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
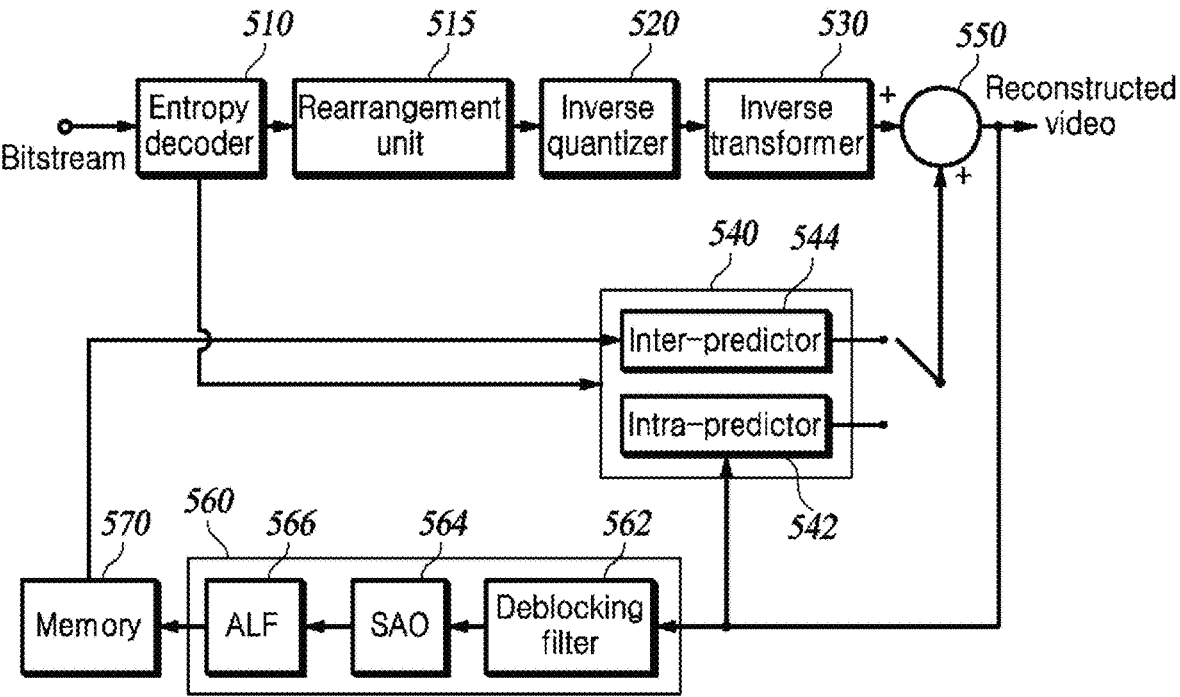
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus for deriving reference sample lines of the current block by using various derivation schemes. The video coding method and the apparatus use the derived reference sample lines to perform intra-prediction of the current block.

The following embodiments may be performed by the intra predictor 122 in the video encoding device. They may also be performed by the intra predictor 542 in the video decoding device.

The video encoding device, in intra-predicting the current block, may generate signaling information associated with the present embodiments in terms of optimizing rate distortion. The video encoding device may use the entropy encoder 155 to encode the signaling information and transmit it to the video decoding device. The video decoding device may use the entropy decoder 510 to decode, from the bitstream, the signaling information associated with the intra-prediction of the current block.

In the following description, the term 'prediction unit' (PU), in particular, the current prediction unit, may be used interchangeably with the current block or coding unit (CU) as described above, or the prediction unit may refer to some region of a coding unit.

Further, a value of true for a flag indicates a case of setting the flag to 1. Additionally, a value of false for a flag indicates a case of setting the flag to 0.

I. Merge Mode of Inter Prediction

The following embodiments may be applied to the inter predictor 124 in the video encoding device.

The following describes a method for composing a merge candidate list of motion information in a merge mode of inter prediction. To support the merge mode, the inter predictor 124 in the video encoding device may select a preset number of (e.g., six) merge candidates to form a merge candidate list.

The inter predictor 124 detects spatial merge candidates. The inter predictor 124 searches for spatial merge candidates from neighboring blocks, as illustrated in FIG. 4. Up to four spatial merge candidates may be selected.

The inter predictor 124 searches for a temporal merge candidate. The inter predictor 124 may add as the temporal merge candidate a block that is co-located with the current block and is in a reference picture (the same one as used to predict the current block or a different picture) not in the current picture where the target block is located. One temporal merge candidate may be selected.

The inter predictor 124 searches for history-based motion vector predictor (HMVP) candidates. The inter predictor 124 may store the motion vectors of the previous n (where n is a natural number) CUs in a table and use the motion vectors as merge candidates. The table has a size of 6 and stores the motion vectors of the previous CUs in a first-in-first-out (FIFO) scheme. This indicates that up to 6 HMVP candidates are stored in the table. The inter predictor 124 may set the most recent motion vectors among the HMVP candidates stored in the table as the merge candidates.

The inter predictor 124 searches for a pairwise average motion vector predictor (PAMVP) candidate. The inter predictor 124 may set the average of the motion vectors of the first candidate and the second candidate in the merge candidate list, as the merge candidate.

If the merge candidate list cannot be populated (i.e., the preset number of candidates is not fulfilled) after performing all of the above search procedures, the inter predictor 124 adds zero motion vectors as merge candidates.

The aforementioned method of composing the merge candidate list in the video encoding device may be equally performed in the video decoding device by the inter predictor 544.

II. Derivation of Reference Sample Lines

The following embodiments are described centering on the intra predictor 542 of the video decoding device, but may be equally implemented in the intra predictor 122 of the video encoding device.

Figure 6:
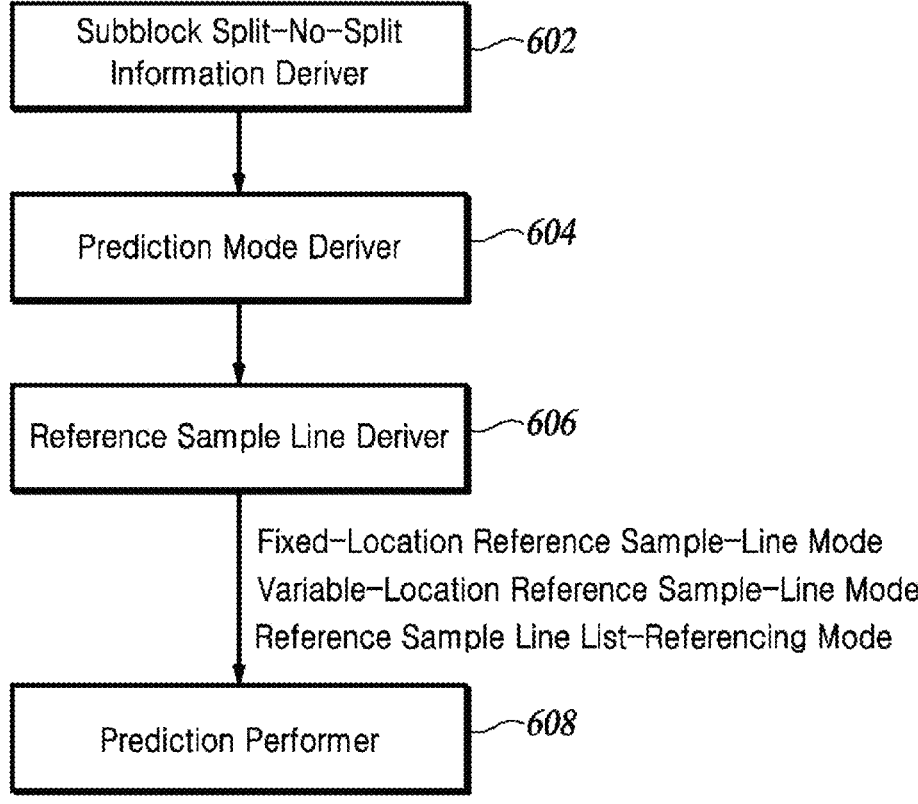
FIG. 6 is a block diagram of a detailed intra predictor according to at least one embodiment of the present disclosure.

FIG. 6 is a block diagram of a detailed intra predictor according to at least one embodiment of the present disclosure.

The intra predictor 542 of the video decoding device may include all or part of a subblock split-no-split information deriver 602, a prediction mode deriver 604, a reference sample line deriver 606, and a prediction performer 608.

The subblock split-no-split information deriver 602 may derive information on whether the current block is to be partitioned into subblocks. If the current block is partitioned into subblocks, the reference sample line deriver 606 and the prediction performer 608 may perform their relevant operations by subblock units.

The prediction mode deriver 604 may derive an intra-prediction mode for the current block. Here, the prediction mode may be a matrix-based prediction mode, a directional prediction mode, a nondirectional prediction mode (such as DC or planar), or the like. For example, the prediction mode deriver 604 may decode the intra-prediction mode from the bitstream.

On the other hand, the operation of the subblock split-no-split information deriver 602 and the prediction mode deriver 604 may also be performed by the entropy decoder 510.

The reference sample line deriver 606 may derive the reference sample lines at the required locations according to the prediction mode.

The prediction performer 608 may generate a prediction block of the current block according to the prediction mode by using the reference samples in the derived reference sample lines.

For example, the reference sample line deriver 606 may decode a derivation mode index indicating a reference sample line-derivation mode of the current block or subblock. The reference sample line deriver 606 may select one of the derivation modes of a fixed-location reference sample-line mode, a variable-location reference sample-line mode, or a reference sample line list-referencing mode according to the derivation mode index, as illustrated in FIG. 6, and then use the selected derivation mode to derive the reference sample line of the current block or current subblock. If at least one of the first condition to the third condition is satisfied, the derivation mode index may be encoded by the video encoding device to indicate the variable-location reference sample-line mode or the reference sample line list-referencing mode. On the other hand, if none of the first to third conditions are satisfied, the derivation mode index may be encoded by the video encoding device to indicate the fixed-location reference sample-line mode.

As another example, the reference sample line deriver 606 may check whether at least one of the first condition to the third condition is satisfied, and if at least one condition is satisfied, it may use the variable-location reference sample-line mode or the reference sample line list-referencing mode. At this time, the reference sample line deriver 606 may parse a flag indicating one of the two modes. On the other hand, if none of the first condition to the third condition is satisfied, the reference sample line deriver 606 may use the fixed-location reference sample-line mode.

The following describes the first to third conditions. Further, the (x, y) coordinate of the top-left pixel of the current block is defined as (0, 0).

Figure 7:
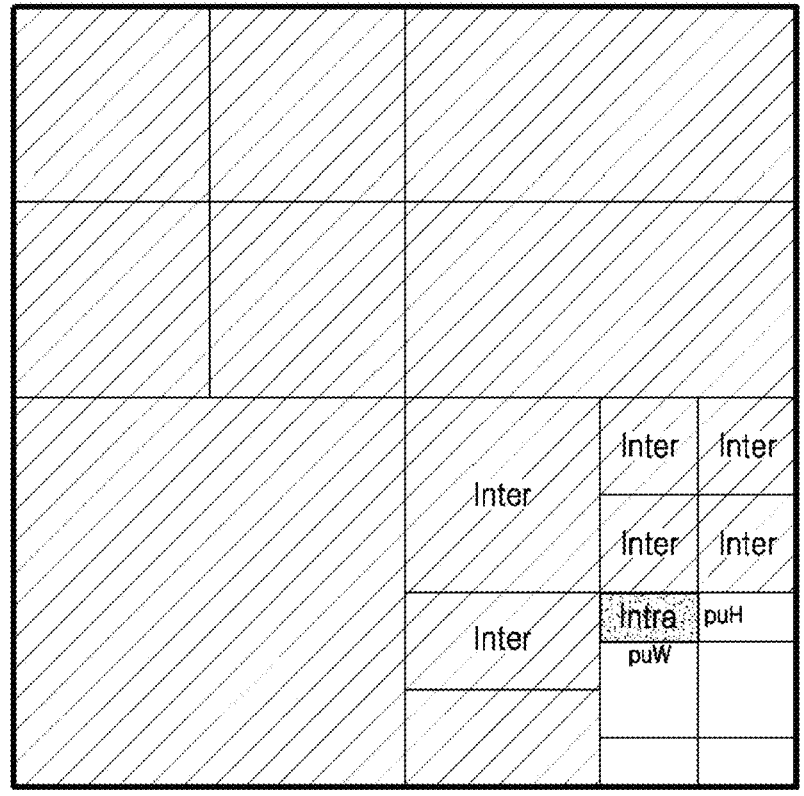
FIG. 7 is a diagram illustrating the first condition of using a variable-location reference sample-line mode or reference sample line list-referencing mode, according to at least one embodiment of the present disclosure.

The first condition is when, as illustrated in FIG. 7, at least a preset number of prediction units among the reconstructed prediction units including the current block's neighboring pixels at preset locations such as (−1, −1), (−1, 0), (0, −1), (−1, puH), and (puW, −1), has been reconstructed by inter prediction. In this first condition, puW and puH denote the horizontal length and vertical length of the current block, i.e., the current prediction unit.

The second condition is that the motion vector encoding mode of the reconstructed prediction units by the inter prediction in the first condition is the spatial merge mode as described above.

The third condition is that the motion vectors of the reconstructed prediction units by the inter prediction in the first condition are similar to each other.

Among the reference sample line-derivation modes, the fixed-location reference sample-line mode utilizes a conventional reference sample line derivation scheme. The reference sample line deriver 606 may be responsive to a selection of the fixed-location reference sample-line mode for deriving as reference sample lines the pixel lines adjacent to the left and top boundaries of the current block, respectively.

FIGS. 8A through 8D are diagrams illustrating the derivation of reference sample lines in the variable-location reference sample-line mode, according to at least one embodiment of the present disclosure.

When the variable-location reference sample-line mode is selected among the reference sample line-derivation modes, the reference sample line deriver 606 may derive reference sample lines that are not adjacent to the current block. For example, the reference sample line deriver 606 may derive, from a pixel line that is N pixels away from the left or top boundary of the current block, a left reference sample line and a top reference sample line, respectively. Alternatively, the reference sample line deriver 606 may select one of a plurality of derivation methods as illustrated in FIGS. 8A through 8D, and derive the left reference sample line and the top reference sample line according to the selected method. A derivation method index of the left reference sample line and a derivation method index of the top reference sample line may be signaled from the video encoding device to the video decoding device. As another example, one derivation method index may be shared for the left reference sample line and the top reference sample line.

The following describes methods of deriving the left reference sample line with reference to FIGS. 8A through 8D.

Figure 8A:
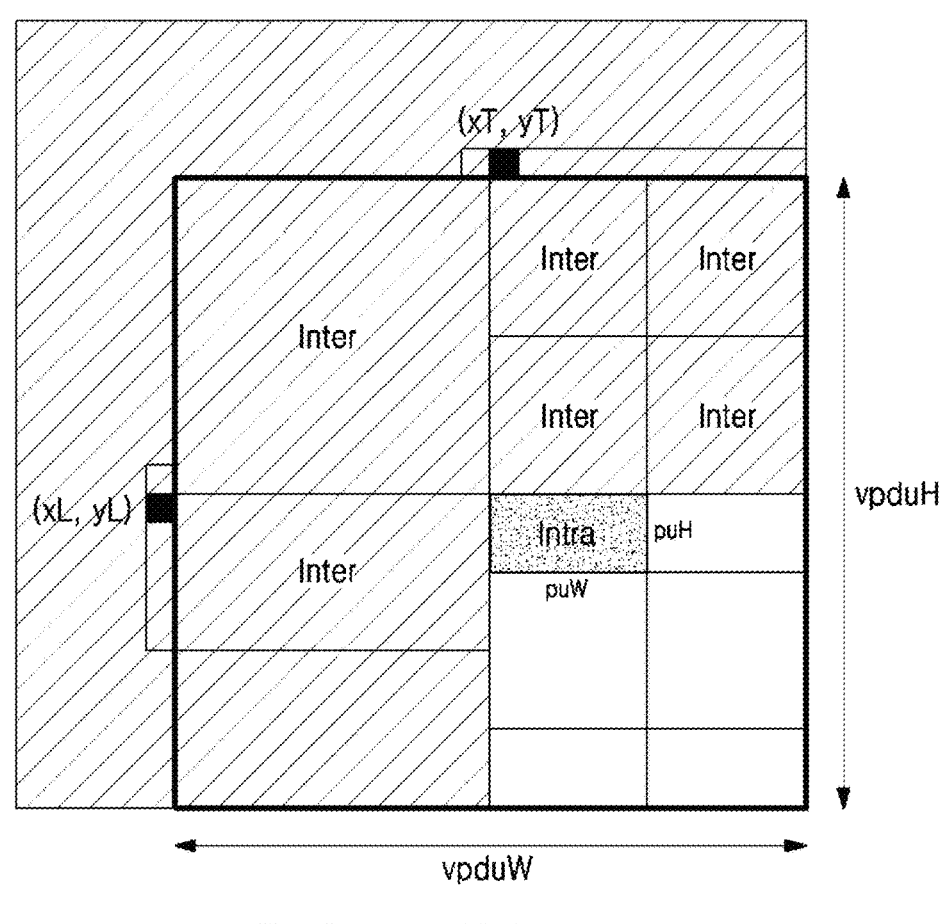
FIGS. 8A through 8D are diagrams illustrating the derivation of reference sample lines in the variable-location reference sample-line mode, according to at least one embodiment of the present disclosure.
Figure 8A:

A first derivation method for the left reference sample line defines as (xL, yL) the coordinates of a pixel, which shares the common y-axis coordinate with the top-left pixel of the current block, among the left neighboring samples of the processing unit containing the current block. The reference sample line deriver 606 may derive the samples in the range of (xL, yL+$\alpha$) to (xL, yL+puH×2−1) as the left reference sample line, as illustrated in FIG. 8A.

Here, $\alpha$ may be a preset integer, such as −1. Additionally, as described above, puW and puH represent the horizontal length and vertical length of the current block, i.e., the current prediction unit.

The processing unit may be generated by partitioning a coding tree unit. One or more coding units may be included in a processing unit, or one or more processing units may be included in a coding unit. An example processing unit is a Virtual Pipeline Data Unit (VPDU). A VPDU is a unit of data that can be processed by a virtual pipeline. A VPDU is the maximum unit that can be encoded and decoded at one time and may be utilized to reduce the cost of hardware implementation as the size of the CTU increases. In the example of FIG. 8A, vpduW and vpduH represent the width and height of a VDPU.

Figure 8B:
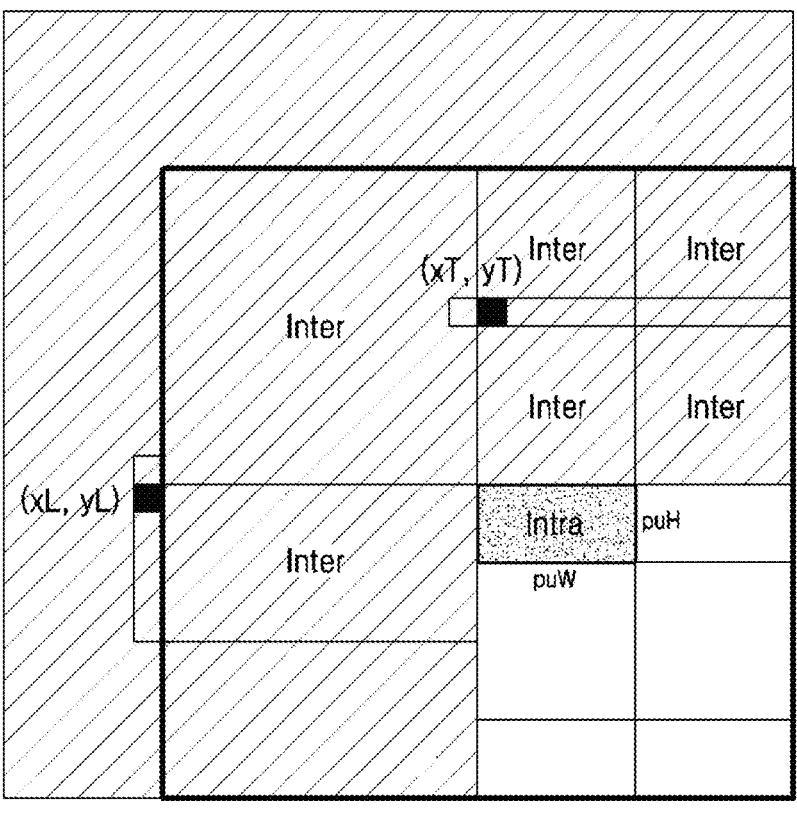

A second derivation method for the left reference sample line defines, as (xL, yL), the coordinates of the pixel, which shares the common y-axis coordinate with the top-left (0, 0) pixel of the current block, among the left neighboring samples of the prediction unit containing the (−1, 0) pixel. The reference sample line deriver 606 may derive the samples in the range of (xL, yL+α) to (xL, yL+puH×2−1) as the left reference sample line, as illustrated in FIG. 8B.

Figure 8C:
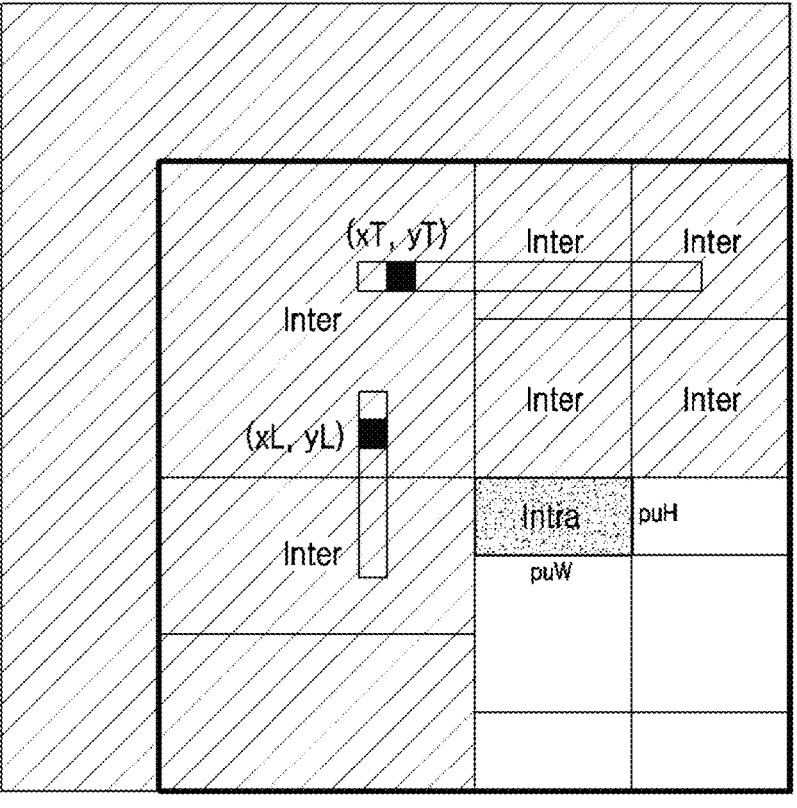

A third derivation method for the left reference sample line defines, as (xL, yL), the coordinates of an arbitrary pixel, which is present at the left of the current block, among a region decoded before the current block within the processing unit. The reference sample line deriver 606 may derive the samples in the range of (xL, yL+α) to (xL, yL+puH×2−1) as the left reference sample line, as illustrated in FIG. 8C. In this case, the y-axis coordinate of the top-left pixel of the current block may be different from the yL coordinate of the arbitrary pixel. The pixels in the derived reference sample line may all be included in the same prediction unit. Alternatively, some pixels may be included in different prediction units.

The coordinates (xL, yL) of the arbitrary pixel may be signaled from the video encoding device to the video decoding device. As another example, offset values between the coordinates of the arbitrary pixel and the coordinates of the top-left pixel of the current block may be signaled from the video encoding device to the video decoding device.

Figure 8D:
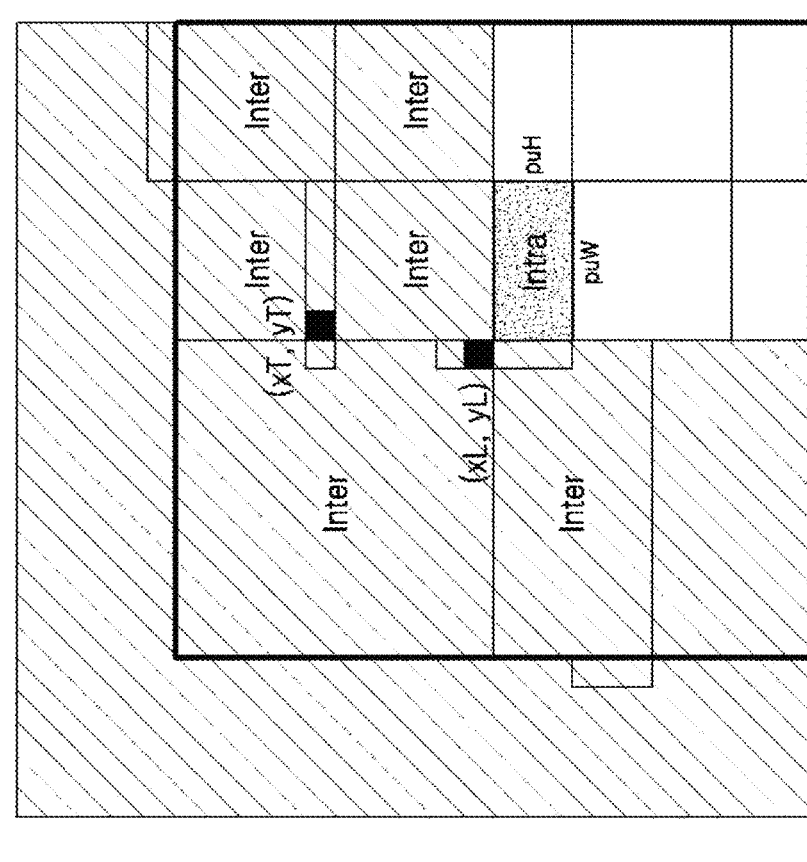
Figure 8D:
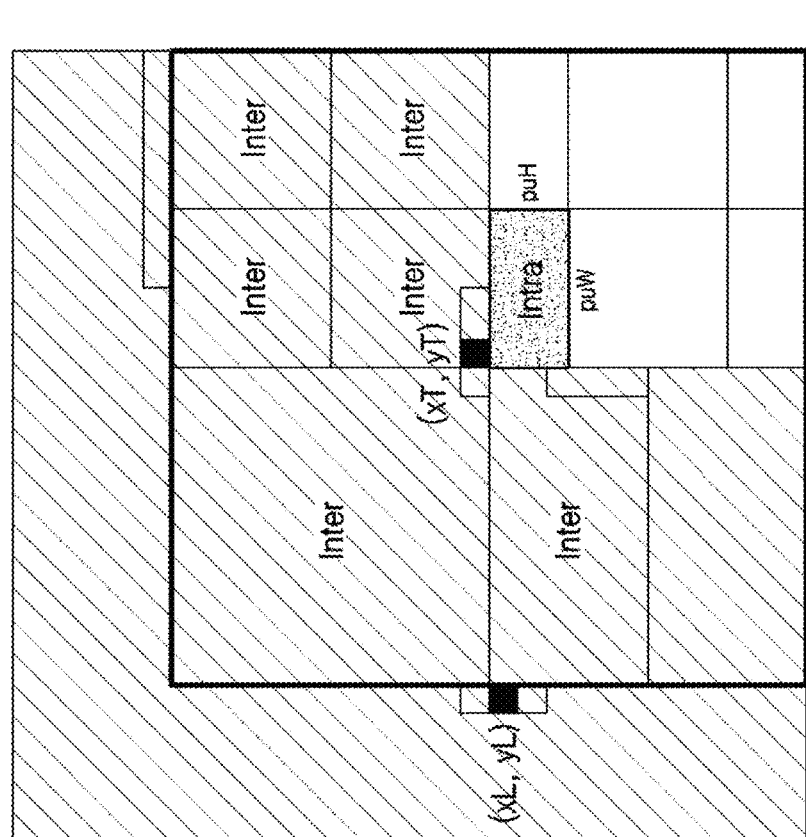

A fourth derivation method for the left reference sample line as illustrated in FIG. 8D may dissimilate the x-axis coordinates of the pixels in the left reference sample line derived according to the first derivation method, the second derivation method, or the third derivation method. Pixels contained in the left reference sample line to have the same x-axis coordinates and continuous y-axis coordinates are defined as a contiguous pixel group. There may be two or more contiguous pixel groups. The number of contiguous pixel groups may be preset, or it may be parsed. Alternatively, the number of contiguous pixel groups may be parsed when a specific directional prediction mode is applied. The lengths of the contiguous pixel groups may be puH, puH+1, puH/2, puH/2+1, and the like.

For each of the contiguous pixel groups, the coordinates and length of the start pixel may be parsed. As another example, a list including the coordinates of the start pixel and a list including the length of the start pixel may be established. Then, for each consecutive pixel group, an index indicating the coordinates of the start pixel and an index indicating the length of the start pixel may be parsed.

The following describes methods of deriving the top reference sample line with reference to FIGS. 8A through 8D.

A first derivation method for the top reference sample line defines, as (xT, yT), the coordinates of a pixel, which shares the common x-axis coordinate with the top-left pixel of the current block, among the top neighboring samples of the processing unit containing the current block. The reference sample line deriver 606 may derive the samples in the range of (xT+α, yT) to (xT+puW×2−1, yT) as the top reference sample line, as illustrated in FIG. 8A.

A second derivation method for the top reference sample line defines, as (xT, yT), the coordinates of the pixel, which shares the common x-axis coordinate with the top-left (0, 0) pixel of the current block, among the top neighboring samples of the prediction unit containing the (0, −1) pixel. The reference sample line deriver 606 may derive the samples in the range of (xT+α, yT) to (xT+puW×2−1, yT) as the top reference sample line, as illustrated in FIG. 8B.

A third derivation method for the top reference sample line defines, as (xT, yT), the coordinates of an arbitrary pixel, which is present at the top of the current block, among a region decoded before the current block within the processing unit. The reference sample line deriver 606 may derive the samples in the range of (xT+α, yT) to (xT+puW× 2−1, yT) as the top reference sample line, as illustrated in FIG. 8C. In this case, the x-axis coordinate of the top-left pixel of the current block may be different from the xT coordinate of the arbitrary pixel.

The coordinates (xT, yT) of the arbitrary pixel may be signaled from the video encoding device to the video decoding device. As another example, offset values between the coordinates of the arbitrary pixel and the coordinates of the top-left pixel of the current block may be signaled from the video encoding device to the video decoding device.

A fourth derivation method for the top reference sample line as illustrated in FIG. 8D may dissimilate the y-axis coordinates of the pixels in the left reference sample line derived according to the first derivation method, the second derivation method, or the third derivation method. Pixels contained in the top reference sample line to have the same y-axis coordinates and continuous x-axis coordinates may be referred to as a contiguous pixel group. There may be two or more contiguous pixel groups. The number of contiguous pixel groups may be preset, or it may be parsed. Alternatively, the number of contiguous pixel groups may be parsed when a specific directional prediction mode is applied. The lengths of the contiguous pixel groups may be puW, puW+1, puW/2, puW/2+1, and the like.

For each of the consecutive pixel groups, the coordinates and length of the start pixel may be parsed. As another example, a list including the coordinates of the start pixel and a list including the length of the start pixel may be established. Then, for each consecutive group of pixels, an index indicating the coordinates of the start pixel and an index indicating the length of the start pixel may be parsed.

Figure 9:
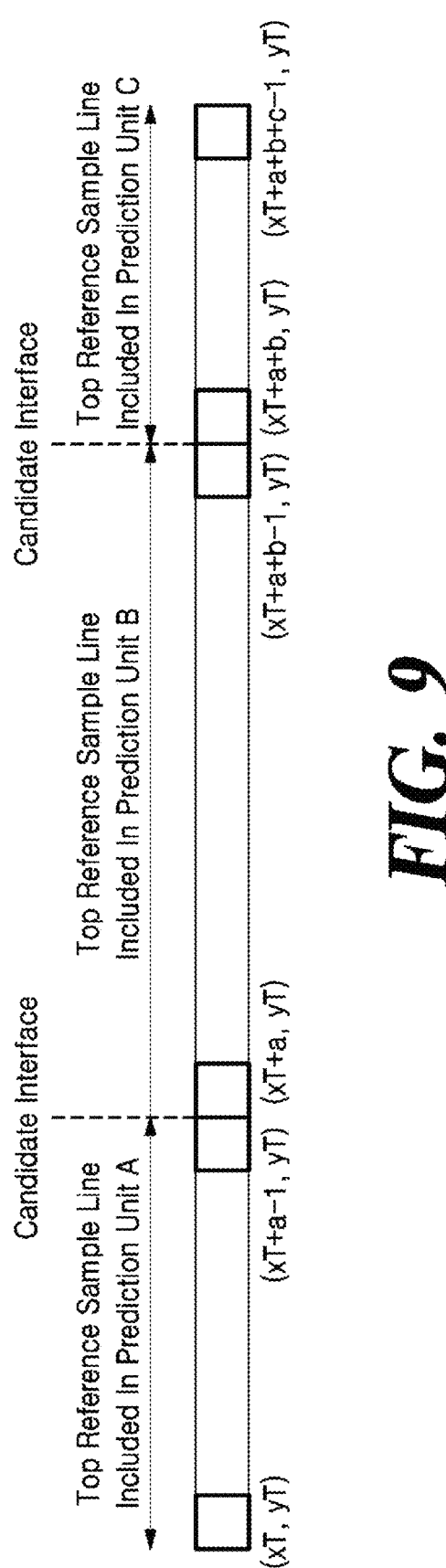
FIG. 9 is a diagram illustrating subdivided reference sample lines within a top reference sample line according to at least one embodiment of the present disclosure.

FIG. 9 is a diagram illustrating subdivided reference sample lines within a top reference sample line according to at least one embodiment of the present disclosure.

When the top reference sample line or the left reference sample line is derived according to its first derivation method, second derivation method, third derivation method, or fourth derivation method, the pixels in the derived reference sample line may all be included in the same prediction unit. Alternatively, some pixels may be included in different prediction units. For example, in the top reference sample line as illustrated in FIG. 9, pixels in the range (xT, yT) to (xT+α−1, yT) may be included in prediction unit A, pixels in the range (xT+α, yT) to (xT+α+b−1, yT) may be included in prediction unit B, and pixels in the range (xT+α+b, yT) to (xT+α+b+c−1, yT) may be included in prediction unit C. Hereinafter, as illustrated in FIG. 9, reference samples, that are included in one prediction unit in the reference sample line, are defined as a subdivided reference sample line.

When the top reference sample line or left reference sample line is derived according to its first derivation method, second derivation method, or third derivation method, the reference sample line deriver 606 may perform deblocking filtering on pixels adjacent to or near the boundaries between the prediction units. In the illustration of FIG. 9, (xT, yT), (xT+α−1, yT), (xT+α, yT), (xT+α+b−1, yT), (xT+α+b, yT), and (xT+α+b+c−1, yT) represent pixels adjacent to boundaries in the top reference sample line.

The reference sample line deriver 606 may determine whether or not to perform filtering to remove a blocking artifact at the candidate pixel boundaries. The filtering may be performed on candidate pixel boundaries that satisfy one or more of the following conditions.

The first condition is that the quantization parameters of the two predictor units on either side of the boundary are different.

The second condition is that the difference in pixel values between two pixels on the boundary is greater than a lower threshold and less than an upper threshold. In this case, the upper threshold may be determined based on the quantization parameters of the two pixels.

The third condition is that the pixel value difference between the start and end pixels of the subdivided reference sample line is less than or equal to the upper threshold.

The reference sample line deriver 606 may perform filtering on the d pixels on either side of the boundary as follows. The reference sample line deriver 606 may derive a filtered value by performing a weighted sum of the values of the 2d pixels to filter an arbitrary pixel p among the 2d pixels described above. In this case, the location of the pixels used for filtering and the weight multiplied by each pixel may be determined by the distance between the pixel p and the boundary. For example, for the pixel at coordinates (xT+α, yT) and the pixel at coordinates (xT+α+1, yT) illustrated in FIG. 9, filtering may be performed as illustrated in Equation 1 and Equation 2.

$$I'(xT + a, yT) = \qquad \text{[Equation 1]}$$
$$(I(xT + a - 2, yT) + 2 \cdot I(xT + a - 1, yT) + 2 \cdot I(xT + a, yT) +$$
$$2 \cdot I(xT + a + 1, yT) + I(xT + a + 2, yT) + 4) \gg 3$$

$$I'(xT + a + 1, yT) = \qquad \text{[Equation 2]}$$
$$(I(xT + a - 1, yT) + I(xT + a, yT) + I(xT + a + 1, yT) +$$
$$I(xT + a + 2, yT) + 2) \gg 2$$

Here, I( ) and I'( ) denote the pixel values before and after filtering.

An equal or similar number of pixels to the left and right (or top and bottom) of the pixel p may be used in the filtering process. The closer the pixel p is to the boundary, the larger the number of near-boundary pixels may be used in the filtering process. The weights, or filter coefficients, may have the characteristics of a low-pass filter. Filter coefficients based on the distance between the pixel p and the boundary may be used, and the closer the pixels are to the pixel p, the greater the absolute value of the filter coefficient may be multiplied.

When the reference sample line list-referencing mode is selected among the reference sample line-derivation modes, the reference sample line deriving 606 may select a reference sample line from the reference sample line list.

One reference sample line list may be used for the left reference sample line and the top reference sample line. Alternatively, separate reference sample line lists may exist for the left reference sample line and the top reference sample line. Additionally, there may be separate reference sample line lists for different reference sample line lengths.

The reference sample line deriver 606 may use the same fixed list as the reference sample line list. Alternatively, the reference sample line deriver 606 may initialize and sequentially update the reference sample line list in units such as subframes, frames, frame groups, and the like. The reference sample line list may be updated as follows.

For example, the top or left boundary sample line of the reconstructed prediction unit may be added to the reference sample line list. Additionally, using the variable-location reference sample-line mode or the reference sample line list-referencing mode, the top or left boundary sample line of the reconstructed prediction unit may be added to the reference sample line list.

The reference sample line deriver 606 may select the (left or top) reference sample line by parsing a list-referencing index that indicates one of the reference sample lines included in the reference sample line list. The video decoding device may also parse a weight to multiply each pixel of the reference sample line or may parse an offset to add to each pixel of the reference sample line.

Figure 10:
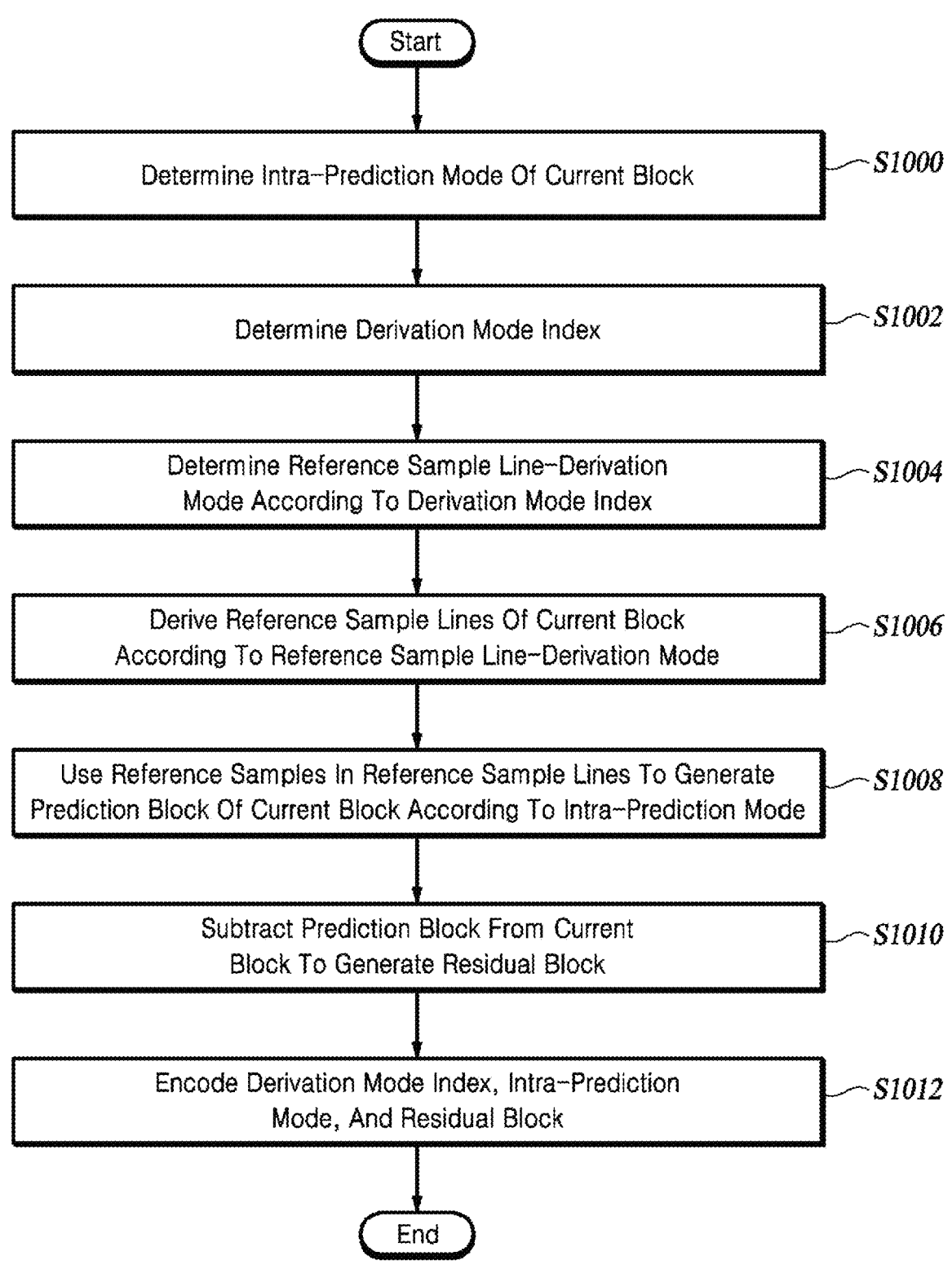
FIG. 10 is a flowchart of a video encoding method according to at least one embodiment of the present disclosure.
Figure 11:
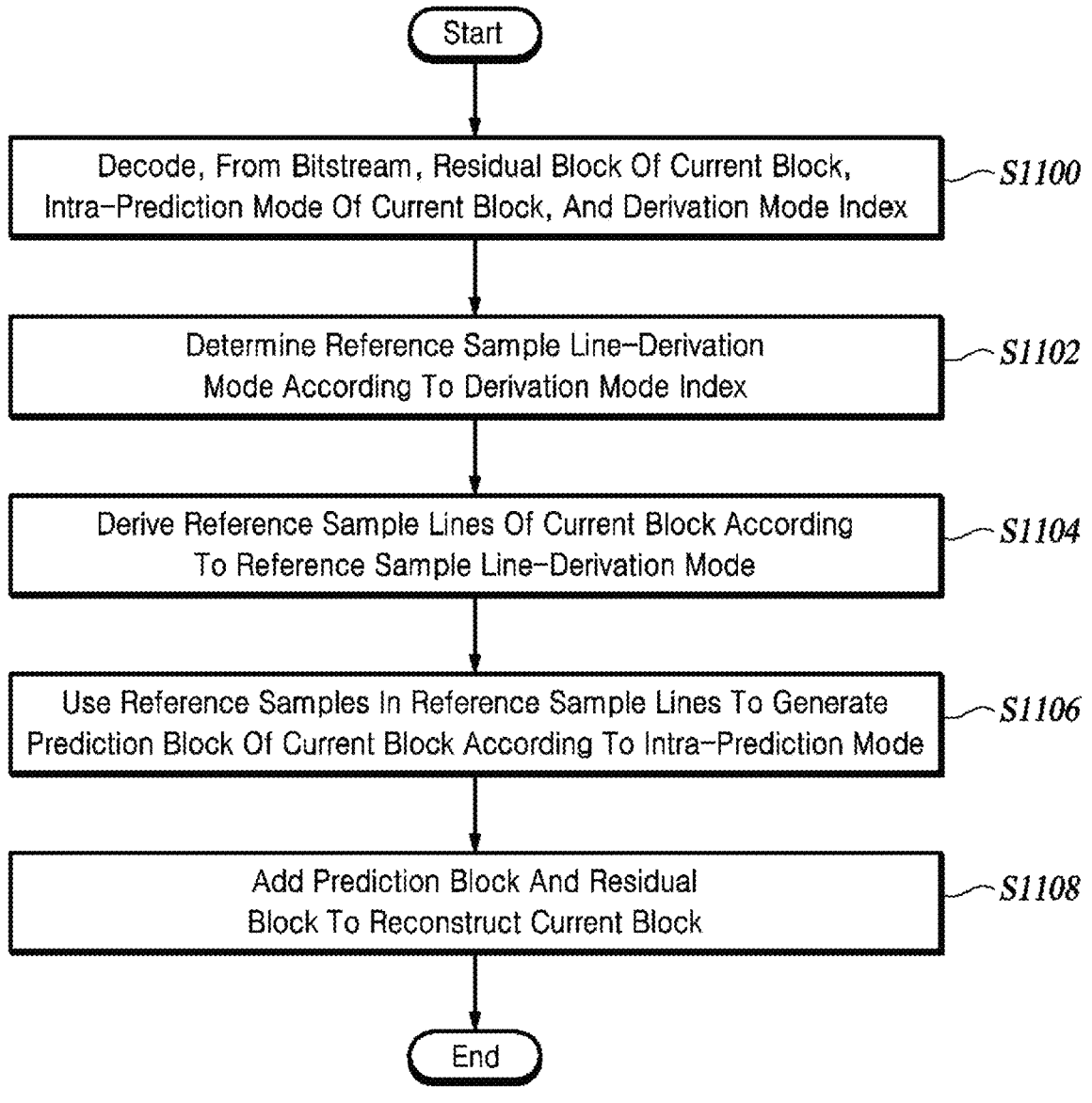
FIG. 11 is a flowchart of a video decoding method according to at least one embodiment of the present disclosure.

Referring now to FIGS. 10 and 11, a video encoding method and a video decoding method using intra prediction based on reference sample line derivation are described.

FIG. 10 is a flowchart of a video encoding method according to at least one embodiment of the present disclosure.

The video encoding device determines an intra-prediction mode of the current block (S1000).

The video encoding device determines a derivation mode index (S1002).

Here, the derivation mode index indicates a reference sample line-derivation mode which is one of a fixed-location reference sample-line mode, a variable-location reference sample-line mode, or a reference sample line list-referencing mode.

In one example, the video encoding device determines whether if at least one of the first condition to the third condition as described above is satisfied, and if so, determines the derivation mode index to indicate the variable-location reference sample line-mode or the reference sample line list-referencing mode. On the other hand, if none of the first condition to the third condition is satisfied, the video encoding device determines the derivation mode index to indicate the fixed-location reference sample-line mode.

As another example, upon checking if at least one of the first condition to the third condition is satisfied, and if so, the video encoding device may use the variable-location reference sample-line mode or the reference sample line list-referencing mode. In terms of optimizing the encoding efficiency, the video encoding device may determine a flag indicating one of these two modes. On the other hand, if none of the first to third conditions is satisfied, the video encoding device may use the fixed-location reference sample-line mode.

The video encoding device determines the reference sample line-derivation mode according to the derivation mode index (S1004).

As another example, the video encoding device may determine the reference sample line-derivation mode based on whether the first condition to the third condition is satisfied, and a flag indicating one of the variable-location reference sample-line mode or the reference sample line list-referencing mode.

The video encoding device derives the reference sample lines of the current block according to the reference sample line-derivation mode (S1006). Here, the reference sample lines include the left reference sample line and the top reference sample line.

If the reference sample line-derivation mode is the fixed-location reference sample-line mode, the video encoding device derives as the reference sample lines the pixel lines adjacent to the left and top boundaries of the current block, respectively.

When the reference sample line-derivation mode is the variable-location reference sample-line mode, in terms of optimizing the encoding efficiency, the video encoding device determines the derivation method index of the left reference sample line and the derivation method index of the top reference sample line. Here, the derivation method index of the left reference sample line and the derivation method index of the top reference sample line each indicate the first derivation method, the second derivation method, the third derivation method, or the fourth derivation method as described above.

Since the method of deriving the reference sample lines by the video encoding device according to the first derivation method to the fourth derivation method has already been described, further detailed description is omitted.

If the reference sample lines derived according to the first derivation method, the second derivation method, or the third derivation method are included in a plurality of prediction units, the video encoding device may perform filtering to remove a blocking artifact on pixels adjacent to boundaries between the plurality of prediction units.

If the reference sample line-derivation mode is the reference sample line list-referencing mode, the video encoding device determines a reference index indicative of one of the reference sample lines included in the reference sample line list. The video encoding device utilizes the reference index to derive the left reference sample line and the top reference sample line from the reference sample line list.

Further, the video encoding device may update the reference sample line list. For example, the video encoding device may add a top boundary sample line or a left boundary sample line of the reconstructed prediction unit to the reference sample line list.

The video encoding device generates a prediction block of the current block according to the intra-prediction mode by using the reference samples in the reference sample lines (S1008).

The video encoding device subtracts the prediction block from the current block to generate a residual block (S1010).

The video encoding device encodes the derivation mode index, the intra-prediction mode, and the residual block (S1012).

FIG. 11 is a flowchart of a video decoding method according to at least one embodiment of the present disclosure.

The video decoding device decodes from the bitstream the residual block of the current block, the intra-prediction mode of the current block, and the derivation mode index (S1100).

Here, the derivation mode index indicates a reference sample line-derivation mode which is one of a fixed-location reference sample-line mode, a variable-location reference sample-line mode, or a reference sample line list-referencing mode.

In one example, if at least one of the first condition to the third condition as described above is satisfied, the derivation mode index may be encoded by the video encoding device to indicate the variable-location reference sample-line mode or the reference sample line list-referencing mode. On the other hand, if none of the first to third conditions are satisfied, the derivation mode index may be encoded by the video encoding device to indicate the fixed-location reference sample-line mode.

As another example, when checking whether at least one of the first condition to the third condition is satisfied determines that it is, the video decoding device may use the variable-location reference sample-line mode or the reference sample line list-referencing mode. In this case, the video decoding device may parse a flag indicating one of these two modes. On the other hand, if none of the first condition to the third condition is satisfied, the video decoding device may use the fixed-location reference sample-line mode.

The video decoding device determines the reference sample line-derivation mode according to the derivation mode index (S1102).

As another example, the video decoding device may determine a reference sample line-derivation mode based on whether the first condition to the third condition is satisfied, and a flag indicating one of the variable-location reference sample-line mode or the reference sample line list-referencing mode.

The video decoding device derives the reference sample lines of the current block according to the reference sample line-derivation mode (S1104). Here, the reference sample lines include a left reference sample line and a top reference sample line.

If the reference sample line-derivation mode is the fixed-location reference sample-line mode, the video decoding device derives as the reference sample lines the pixel lines adjacent to the left and top boundaries of the current block, respectively.

When the reference sample line-derivation mode is the variable-location reference sample-line mode, the video decoding device decodes, from the bitstream, the derivation method index of the left reference sample line and the derivation method index of the top reference sample line. The derivation method index of the left reference sample line and the derivation method index of the top reference sample line each indicate its first derivation method, second derivation method, third derivation method, or fourth derivation method.

Since the method of deriving the reference sample lines by the video decoding device according to the first derivation method to the fourth derivation method has already been described, further detailed description is omitted.

If the reference sample lines derived according to the first derivation method, the second derivation method or the third derivation method are included in a plurality of prediction units, the video decoding device may perform filtering to remove a blocking artifact on pixels adjacent to boundaries between the plurality of prediction units.

If the reference sample line-derivation mode is the reference sample line list-referencing mode, the video decoding device decodes from the bitstream a reference index that indicates one of the reference sample lines included in the reference sample line list. The video decoding device utilizes the reference index to derive the left reference sample line and the top reference sample line from the reference sample line list.

Further, the video decoding device may update the reference sample line list. For example, the video decoding device may add a top boundary sample line or a left boundary sample line of the reconstructed prediction unit to the reference sample line list.

The video decoding device uses the reference samples in the reference sample lines to generate a prediction block of the current block according to the intra-prediction mode (S1106).

The video decoding device adds the prediction block and the residual block to reconstruct the current block (S1108).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

What is claimed is:

1. A method performed by a video decoding device for intra-predicting a current block, the method comprising:
  decoding, from a bitstream, an intra-prediction mode of the current block, and a derivation mode index of the current block, the derivation mode index indicating a reference sample line-derivation mode that is one of a fixed-location reference sample-line mode, a variable-location reference sample-line mode, or a reference sample line list-referencing mode;
  determining the reference sample line-derivation mode according to the derivation mode index;
  deriving reference sample lines of the current block according to the reference sample line-derivation mode, the reference sample lines including a left reference sample line and a top reference sample line; and
  generating a prediction block of the current block according to the intra-prediction mode by using reference samples in the reference sample lines,
  wherein when the reference sample line-derivation mode is the reference sample line list-referencing mode:
  decoding, from the bitstream, a reference index indicative of one of reference sample lines included in a reference sample line list, and
  wherein deriving the reference sample lines includes:
  deriving, by using the reference index, the left reference sample line and the top reference sample line from the reference sample line list.

2. The method of claim 1, wherein the derivation mode index is encoded when satisfying a first condition, by the video encoding device to indicate the variable-location reference sample-line mode or the reference sample line list-referencing mode,
  wherein the first condition is equivalent to when at least a preset number of prediction units among reconstructed prediction units including neighboring pixels of the current block and at preset locations, has been reconstructed by inter prediction.

3. The method of claim 1, wherein deriving the reference sample lines includes:
  when the reference sample line-derivation mode is the fixed-location reference sample-line mode, deriving, as the reference sample lines, pixel lines adjacent to left and top boundaries of the current block, respectively.

4. The method of claim 1, further comprising:
  when the reference sample line-derivation mode is the variable-location reference sample-line mode, decoding, from the bitstream, a derivation method index of a left reference sample line and a derivation method index of a top reference sample line, the derivation method index of the left reference sample line and the derivation method index of the top reference sample line each indicating utilization of a first derivation method, a second derivation method, or a third derivation method.

5. The method of claim 4, wherein deriving the reference sample lines includes:
  deriving samples in a range of (xL, yL+α) to (xL, yL+puH×2−1) as the left reference sample line, when the first derivation method is utilized and (xL, yL) are coordinates of a pixel, which shares a common y-axis coordinate with a top-left pixel of the current block, among left neighboring samples of a processing unit containing the current block,
  wherein the α is a preset integer and the puH is a height of the current block.

6. The method of claim 5, wherein the processing unit is generated by partitioning a coding tree unit (CTU), and the processing unit includes at least one or more coding units.

7. The method of claim 4, wherein deriving the reference sample lines includes:
  deriving samples in a range of (xL, yL+α) to (xL, yL+puH×2−1) as the left reference sample line, when the second derivation method is utilized and (xL, yL) are coordinates of a pixel, which shares a common y-axis coordinate with a top-left (0, 0) pixel of the current block, among left neighboring samples of a prediction unit containing an (−1, 0) pixel,
  wherein the α is a preset integer and the puH is a height of the current block.

8. The method of claim 4, wherein deriving the reference sample lines includes:
  deriving samples in a range of (xL, yL+α) to (xL, yL+puH×2−1) as the left reference sample line, when the third derivation method is utilized and (xL, yL) are coordinates of an arbitrary pixel, which is present at a left side of the current block, among a region decoded before the current block within a processing unit,
  wherein the α is a preset integer and the puH is a height of the current block.

9. The method of claim 4, wherein deriving the reference sample lines includes:
  when the reference sample lines derived according to the first derivation method, the second derivation method, or the third derivation method are included in a plurality of prediction units, performing filtering for removing a blocking artifact on pixels adjacent to boundaries between the plurality of prediction units.

10. The method of claim 1, wherein deriving the reference sample lines includes:

updating the reference sample line list by adding a top boundary sample line or a left boundary sample line of a reconstructed prediction unit to the reference sample line list.

11. A method performed by a video encoding device for intra-predicting a current block, the method comprising:

determining an intra-prediction mode of the current block;

determining a reference sample line-derivation mode of the current block, wherein the reference sample line-derivation mode is selected from at least one of: a fixed-location reference sample-line mode, a variable-location reference sample-line mode, or a reference sample line list-referencing mode;

determining reference sample lines of the current block according to the reference sample line-derivation mode, the reference sample lines including a left reference sample line and a top reference sample line; and generating a prediction block of the current block according to the intra-prediction mode by using reference samples in the reference sample lines; and encoding a derivation mode index indicating the reference sample line-derivation mode, wherein, when the reference sample line-derivation mode is the reference sample line list-referencing mode, the method further comprises encoding a reference index indicating the reference sample lines of the current block in a reference sample line list.

12. The method of claim 11, wherein the derivation mode index indicates, under a first condition when satisfied, the variable-location reference sample-line mode or the reference sample line list-referencing mode, wherein the first condition is equivalent to when at least a preset number of prediction units among reconstructed prediction units including neighboring pixels of the current block and at preset locations, has been reconstructed by inter prediction.

13. A non-transitory computer-readable recording medium storing a bitstream generated by a video encoding method, the video encoding method comprising:

determining an intra-prediction mode of the current block;

determining a reference sample line-derivation mode of the current block, wherein the reference sample line-derivation mode is selected from at least one of: a fixed-location reference sample-line mode, a variable-location reference sample-line mode, or a reference sample line list-referencing mode;

determining reference sample lines of the current block according to the reference sample line-derivation mode, the reference sample lines including a left reference sample line and a top reference sample line; and generating a prediction block of the current block according to the intra-prediction mode by using reference samples in the reference sample lines; and encoding a derivation mode index indicating the reference sample line-derivation mode, wherein, when the reference sample line-derivation mode is the reference sample line list-referencing mode, the method further comprises encoding a reference index indicating the reference sample lines of the current block in a reference sample line list.

* * * * *